3,764,481
PROCESS FOR THE PREVENTION OF EXPLOSIONS IN FERMENTATION REACTIONS INVOLVING BURNABLE COMPONENTS

Hans Muller, Im Almendli, Erlenbach, Zurich, Switzerland
No Drawing. Filed Sept. 4, 1970, Ser. No. 69,910
Claims priority, application Switzerland, Sept. 5, 1969, 13,522/69
Int. Cl. C12b 1/14
U.S. Cl. 195—109                    9 Claims

ABSTRACT OF THE DISCLOSURE

In fermentation reactions in which burnable compounds are used as the source of carbon, the possibility of explosion is present since oxygen-containing gases must also be introduced. Emulsification of the entire contents of the reaction vessel eliminates the danger of explosion within the vessel. On leaving the vessel, the emulsion may be broken either by mechanical or chemical means. At this point a gas which does not support combustion may be added to dilute the gaseous mixture released from the emulsion and thereby eliminate the danger of explosion external to the reaction vessel.

BACKGROUND OF THE INVENTION

In many fermentation processes such as, for example, the production of yeast or amino acids, burnable liquids or gases are used as a source of carbon. Typical examples are methane and petroleum fractions. Since these processes are almost invariably aerobic, air or pure oxygen must be introduced to the nutrient medium. As a result, explosive gas mixtures can easily be formed which may be raised to the ignition temperature by a variety of means such as by rubbing of the mixing apparatus on the walls of the system.

SUMMARY OF THE INVENTION

It is an object of the invention to avoid explosions in aerobic fermentation systems when burnable compounds are used as the source of carbon.

It is a further object of the invention to avoid explosions both in the reaction vessel and in the components of the system into which the reaction vessel contents are discharged.

The object of the invention is achieved by adding an emulsifying agent and emulsifying the contents of the vessel. As a result of these steps, the burnable carbon compound and the oxygen-containing gas are finely divided and completely contained within the aqueous medium.

DESCRIPTION OF THE PREFERRED EMBODIMENTS

The method of carrying out the process according to the present invention when methane is used as the source of carbon is as follows:

Methane is introduced into a vessel containing a nutrient medium and equipped with a number of stirrers. Oxygen is also introduced into a porton of the reaction vessel removed from that at which the methane is introduced. Through the action of the mixers, the gases are dispersed in the aqueous reaction medium in fine bubbles. A gas mixture emulsified in water in this way, will not explode.

Alternatively, the carbon-containing compound and the oxygen-containing gas may be introduced successively with emulsification being carried out subsequent to each addition.

To bring about the emulsification, it is necessary that a surface active agent be present.

It is customary to supply the reacting gases in excess and to remove the excess together with the products of the reaction consisting mostly of carbon dioxide. The efflux is led into a liquid separator where the emulsion is broken and from which the nutrient medium is returned to the reaction vessel. The emulsion can be broken either mechanically or chemically. For mechanical breaking of the emulsion rotating foam destroyers or scrubbers can be used. Compounds which can break the emulsion chemically are listed below.

In the event that the gas leaving the emulsion breaker is still in the explosion range, it can be mixed with explosion-inhibiting gases or vapors such as nitrogen, carbon dioxide or water vapor, to take it out of the explosive range immediately on leavng the vessel in which the explosive gas is separated from the emulsion.

Following are examples of surface-active agents which I have found useful in preparing emulsions according to the present invention:

Ammonium oleate
    Triethanolamine stearate

Following are examples of burnable compounds suitable for use as sources of carbon in accordance with the invention disclosed herein:

Methane
Natural gas (methane with parts of ethane, propane, carbon dioxide)

Following are examples of compounds suitable for use as emulsion-breakers:

Silicon foam-breakers
    Dimethylpolysiloxane

Following are examples showing how the process of the present invention is carried out:

EXAMPLE 1

A fermentation vessel with emulsification tubes (similar to apparatus described in 3,448,250) was filled to 60% of its volume with water and nutrient salts (1.0 g. $NH_4Cl$, 0.5 g. $KH_2PO_4$, 0.2 g. $MgSO_4$ per liter of water) sterilized with steam (30 minutes at 250° F.), cooled to 90° F. and inoculated with a strain of *Pseudomonas methanica*. Then sterile air was introduced and broken up into small bubbles in the solution by means of stirring means so that the air-solution mixture filled the entire vessel. The introduction of sterile air was continued at a high rate amounting to three times the volume of the vessel per minute. The foam leaving the vessel was separated into gas and water in a foam separator such as is described in the above patent so that the air could be taken off free of foam. Then methane was introduced in a manner similar to the way in which the air was introduced. The gases escaped directly from the foam breaker into the ambient air, in order to avoid an explosion in this location. At the completion of the process, the methane flow was cut off first and then the air flow.

EXAMPLE 2

A procedure similar to that of Example 1 was followed, but with continuous introduction of nutrient solution and continuous removal of gas-liquid emulsion. The introduction of the solution was carried out by means of a pump followed by passage of the nutrient through a sterilizer and a cooler, in this case a plate heat-exchanger. Natural gas, consisting of 85% methane, 10% ethane, the remainder being propane and carbon dioxide was used as the source of carbon.

The output of liquid converted by organisms was automatically controlled by means of the weight of the fermenter. It could also have been automatically controlled by means of the current drawn by the mixing device.

Since the vessel was completely filled by the emulsion throughout the operation, the usual float control could not be used.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an aerobic fermentation process, the steps of introducing into a reaction vessel an aqueous nutrient medium and a gaseous or liquid combustible component which serves as a source of carbon and which upon mixing with oxygen is capable of exploding; introducing into said vessel separately from said combustible component and below the surface of the medium a gas consisting at least in part of oxygen; and emulsifying the entire contents of said vessel while said gas is below the surface of the medium so as to form an emulsion which completely fills said vessel, said emulsion comprising a fine dispersion of said combustible component and said gas within said aqueous nutrient medium, whereby explosion due to reaction of said combustible component with said oxygen is prevented.

2. A process as defined in claim 1, comprising the further steps of removing said emulsion from said reaction vessel; and breaking said emulsion into its components immediately on leaving said vessel.

3. A process as defined in claim 2, wherein said breaking of said emulsion is effected by a mechanical foam-breaker.

4. A process as defined in claim 2, wherein said breaking of said emulsion is effected chemically.

5. A process as defined in claim 2, further comprising the step of adding an explosion-arresting means to the gaseous component of said emulsion immediately on leaving said reaction vessel.

6. A process as defined in claim 5, wherein said explosion-arresting means is selected from the group consisting of nitrogen, carbon dioxide and water vapor.

7. A process as defined in claim 1 further comprising the step of adding an emulsifying agent.

8. A process as defined in claim 1, wherein the inlets for introduction of said combustible component and said gas are spaced from each other.

9. A process as defined in claim 1, wherein said combustible component and said gas are introduced one after the other, and wherein after each introduction emulsification of the resultant mixture is carried out.

References Cited
UNITED STATES PATENTS

| | | | |
|---|---|---|---|
| 3,677,895 | 7/1972 | Hashimoto | 195—109 X |
| 3,355,296 | 11/1967 | Perkins et al. | 195—28 R X |
| 3,474,001 | 10/1969 | Leavitt | 195—28 R |
| 3,326,770 | 6/1967 | Coty | 195—96 X |
| 3,222,258 | 12/1965 | Iizuka et al. | 195—3 H X |
| 3,616,260 | 10/1971 | Müller | 195—107 |
| 2,995,497 | 8/1961 | Hedén | 195—107 |

ALVIN E. TANENHOLTZ, Primary Examiner

M. D. HENSLEY, Assistant Examiner

U.S. Cl. X.R.

195—29, 82